(12) United States Patent
Kiefhaber et al.

(10) Patent No.: US 8,731,177 B1
(45) Date of Patent: *May 20, 2014

(54) DATA MODEL OF PARTICIPATION IN MULTI-CHANNEL AND MULTI-PARTY CONTACTS

(75) Inventors: Sara Hildebrandt Kiefhaber, Boulder, CO (US); Robert W. Snyder, Danville, CA (US); Robin Donald Taylor, Danville, CA (US); David Zanoni, Bethlehem, PA (US)

(73) Assignee: Avaya Inc., Basking Ridge, NJ (US)

( * ) Notice: Subject to any disclaimer, the term of this patent is extended or adjusted under 35 U.S.C. 154(b) by 933 days.

This patent is subject to a terminal disclaimer.

(21) Appl. No.: 12/242,916

(22) Filed: Oct. 1, 2008

Related U.S. Application Data

(62) Division of application No. 10/861,193, filed on Jun. 3, 2004, now Pat. No. 7,953,859.

(60) Provisional application No. 60/558,613, filed on Mar. 31, 2004.

(51) Int. Cl.
*H04M 3/00* (2006.01)
*H04M 5/00* (2006.01)

(52) U.S. Cl.
USPC .................................................. 379/265.09

(58) Field of Classification Search
USPC .................. 379/266.1, 133, 265.09, 67.1
See application file for complete search history.

(56) References Cited

U.S. PATENT DOCUMENTS

| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |

(Continued)

FOREIGN PATENT DOCUMENTS

| CA | 2143198 | 1/1995 |
| CA | 2174762 | 3/1996 |

(Continued)

OTHER PUBLICATIONS

Bischoff et al. "Data Ware House Building Method—practical advices telled by persons having experience and experts", Kyouritsu Shuppan Corp. May 30, 2000, first edition, pp. 197-216.

(Continued)

*Primary Examiner* — Sonia Gay
(74) *Attorney, Agent, or Firm* — Sheridan Ross P.C.

(57) ABSTRACT

The present invention is directed to a contact center that includes a switching fabric 110, 130 operable to configure a communication session between a first customer and a first resource 138 for servicing of a first contact by the first resource and a contact tracking agent 232 operable, during the servicing of the first contact by the first resource, to (a) monitor the first contact center endpoint for at least one of (i) a change in contact state, (ii) the connection of the first resource and the first customer through a second (new) communication channel, and (iii) the addition of a party to and/or removal of a party from the communication session and (b), when the at least one of (i)-(iii) occurs, terminate a first contact part and create a second contact part. The first and second contact parts are associated with the communication session.

16 Claims, 8 Drawing Sheets

(56) References Cited

U.S. PATENT DOCUMENTS

| | | |
|---|---|---|
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,533,103 A * | 7/1996 | Peavey et al. .................... 379/69 |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,673,205 A | 9/1997 | Brunson |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,781,614 A | 7/1998 | Brunson |
| 5,784,452 A | 7/1998 | Carney |
| 5,787,410 A | 7/1998 | McMahon |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,924,098 A * | 7/1999 | Kluge .................................. 1/1 |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,002,753 A * | 12/1999 | Morrison et al. ........ 379/112.01 |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |

(56) References Cited

U.S. PATENT DOCUMENTS

| | | |
|---|---|---|
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | McIllwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |
| 6,366,668 B1 | 4/2002 | Borst et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,408,066 B1 | 6/2002 | Andruska et al. |
| 6,408,277 B1 | 6/2002 | Nelken |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,611,590 B1 * | 8/2003 | Lu et al. .................. 379/265.09 |
| 6,614,903 B1 | 9/2003 | Flockhart et al. |
| 6,650,748 B1 | 11/2003 | Edwards et al. |
| 6,662,188 B1 | 12/2003 | Rasmussen et al. |
| 6,668,167 B2 | 12/2003 | McDowell et al. |
| 6,675,168 B2 | 1/2004 | Shapiro et al. |
| 6,684,192 B2 | 1/2004 | Honarvar et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,718,022 B1 * | 4/2004 | Ehrlich et al. ................ 379/133 |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | McIllwaine et al. |
| 6,785,666 B1 | 8/2004 | Nareddy et al. |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,046,789 B1 * | 5/2006 | Anderson et al. ........ 379/265.01 |
| 7,054,434 B2 | 5/2006 | Rodenbusch et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,136,873 B2 | 11/2006 | Smith et al. |
| 7,149,733 B2 | 12/2006 | Lin et al. |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,625 B1 | 5/2007 | McKenna et al. |
| 7,215,744 B2 | 5/2007 | Scherer |
| 7,222,075 B2 | 5/2007 | Petrushin |
| 7,246,371 B2 | 7/2007 | Diacakis et al. |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,336,779 B2 | 2/2008 | Boyer et al. |
| 7,340,408 B1 | 3/2008 | Drew et al. |
| 7,373,341 B2 | 5/2008 | Polo-Malouvier |
| 7,376,127 B2 | 5/2008 | Hepworth et al. |
| 7,386,100 B2 | 6/2008 | Michaelis |
| 7,392,402 B2 | 6/2008 | Suzuki |
| 7,409,423 B2 | 8/2008 | Horvitz et al. |
| 7,415,417 B2 | 8/2008 | Boyer et al. |
| 7,418,093 B2 | 8/2008 | Knott et al. |
| 7,499,844 B2 | 3/2009 | Whitman, Jr. |
| 7,500,241 B1 | 3/2009 | Flockhart et al. |
| 7,526,440 B2 | 4/2009 | Walker et al. |
| 7,545,761 B1 | 6/2009 | Kalbag |
| 7,545,925 B2 | 6/2009 | Williams |
| 7,885,209 B1 | 2/2011 | Michaelis et al. |
| 2001/0011228 A1 | 8/2001 | Shenkman |
| 2001/0034628 A1 | 10/2001 | Eder |
| 2001/0040942 A1 * | 11/2001 | Glowny et al. ............ 379/88.22 |
| 2002/0019829 A1 | 2/2002 | Shapiro |
| 2002/0021307 A1 | 2/2002 | Glenn et al. |

(56) References Cited

U.S. PATENT DOCUMENTS

| | | |
|---|---|---|
| 2002/0035605 A1 | 3/2002 | McDowell et al. |
| 2002/0038422 A1 | 3/2002 | Suwamoto et al. |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0123923 A1 | 9/2002 | Manganaris et al. |
| 2002/0147730 A1 | 10/2002 | Kohno |
| 2002/0194096 A1 | 12/2002 | Falcone et al. |
| 2003/0004704 A1 | 1/2003 | Baron |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0108186 A1 | 6/2003 | Brown et al. |
| 2003/0144900 A1 | 7/2003 | Whitmer |
| 2003/0144959 A1 | 7/2003 | Makita |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0193646 A1 | 9/2004 | Cuckson et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0240659 A1 | 12/2004 | Gagle et al. |
| 2004/0249650 A1 | 12/2004 | Freedman et al. |
| 2004/0260706 A1 | 12/2004 | Anonsen et al. |
| 2005/0021529 A1 | 1/2005 | Hodson et al. |
| 2005/0044375 A1 | 2/2005 | Paatero et al. |
| 2005/0049911 A1 | 3/2005 | Engelking et al. |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0228707 A1 | 10/2005 | Hendrickson |
| 2005/0261035 A1 | 11/2005 | Groskreutz et al. |
| 2005/0283393 A1 | 12/2005 | White et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0015388 A1 | 1/2006 | Flockhart et al. |
| 2006/0026049 A1 | 2/2006 | Joseph et al. |
| 2006/0056598 A1 | 3/2006 | Brandt et al. |
| 2006/0058049 A1 | 3/2006 | McLaughlin et al. |
| 2006/0100973 A1 | 5/2006 | McMaster et al. |
| 2006/0135058 A1 | 6/2006 | Karabinis |
| 2006/0167667 A1 | 7/2006 | Maturana et al. |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0271418 A1 | 11/2006 | Hackbarth et al. |
| 2006/0285648 A1 | 12/2006 | Wahl et al. |
| 2007/0038632 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0127643 A1 | 6/2007 | Keagy |
| 2007/0156375 A1 | 7/2007 | Meier et al. |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0230681 A1 | 10/2007 | Boyer et al. |
| 2008/0056165 A1 | 3/2008 | Petrovykh |
| 2009/0228474 A1 | 9/2009 | Chiu et al. |

FOREIGN PATENT DOCUMENTS

| | | |
|---|---|---|
| EP | 0501189 | 9/1992 |
| EP | 0576205 | 12/1993 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| EP | 1761078 | 3/2007 |
| GB | 2273418 | 6/1994 |
| GB | 2290192 | 12/1995 |
| JP | 07-007573 | 1/1995 |
| JP | 2001-053843 | 2/2001 |
| JP | 2002-032977 | 1/2002 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/80094 | 10/2001 |
| WO | WO 02/099640 | 12/2002 |
| WO | WO 03/015425 | 2/2003 |

OTHER PUBLICATIONS

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.
Koutarou, "Building a Framework for EC using Hibernate, OSWorkflow", JAVA Press, Japan, Gujutsu Hyouron Company, vol. 25, 2004, pp. 132-147.
Microsoft R Access 97 for Windows R Application development guide, Ver. 8.0, Microsoft Corp., a first version, pp. 569-599.
Official Action for U.S. Appl. No. 10/861,193, mailed Sep. 28, 2009.
Notice of Allowance for U.S. Appl. No. 10/861,193, mailed Jan. 6, 2011.
Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom . . . , 1 page.
Overview of Avaya IP Softphone printed on Sep. 15, 2009 from http://support.avaya.com/elmodocs2/ip_softphone/Overview_IP_Softphone_R6.htm, 2 pages.
U.S. Appl. No. 12/569,581, filed Sep. 29, 2009, Michaelis.
Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age . . . , 1 page.
Product Description of "Avaya one-X Agent," printed on Sep. 15, 2009 from http://www.avaya.com/usa/product/avaya-one-x-agent, 1 page.
Product Overview of "IP Softphone" printed on Sep. 15, 2009 from http://wvvw.nacr.com/Products.aspx?id=236, 3 pages.
Official Action for U.S. Appl. No. 10/861,193, mailed Apr. 1, 2010.
Hellstrom et al., RFC-4103 Protocol, entitled "RTP Payload for Text Conversation," Network Working Group, http://www.rfc-editor.org/rfc/rfc4103.txt, Jun. 2005, 18 pages.

(56) References Cited

OTHER PUBLICATIONS

Venkatesan et al., "A Customer Lifetime Value Framework for Customer Selection and Resource Allocation Strategy," Journal of Marketing, Oct. 2004, vol. 68, pp. 106-125.
U.S. Appl. No. 11/956,779, filed Dec. 14, 2007, Burritt et al.
US 6,537,685, 3/2003, Higuchi (withdrawn).
U.S. Appl. No. 10/815,534, filed Mar. 31, 2004, Kiefhaber.
U.S. Appl. No. 10/815,566, filed Mar. 31, 2004, Kiefhaber.
U.S. Appl. No. 10/815,584, filed Mar. 31, 2004, Kiefhaber.
U.S. Appl. No. 10/861,193, filed Jun. 3, 2004, Flockhart et al.
U.S. Appl. No. 10/946,638, filed Sep. 20, 2004, Flockhart et al.
U.S. Appl. No. 11/087,290, filed Mar. 22, 2005, Michaelis.
U.S. Appl. No. 11/199,828, filed Aug. 8, 2005, Bland et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick.
U.S. Appl. No. 12/195,542, filed Aug. 18, 2008, Olson.
"When Talk isn't Cheap," Sm@rt Reseller, v. 3, n. 13 (Apr. 3, 2000), p. 50.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages.
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Bill Michael, "The Politics of Naming" www.cConvergence.com (Jul. 2001) pp. 31-35.
Chavez, David, et al., "Avaya MultiVantage Software: Adapting Proven Call Processing for the Transition to Converged IP Networks," Avaya, Inc., Aug. 2002.
Coles, Scott, "A Guide for Ensuring Service Quality in IP Voice Networks," Avaya, Inc., 2002, pp. 1-17.
Creating and Using Data Warehouse-Using Dimensional Modeling (Microsoft) downloaded May 18, 2005 http://msdn.microsoft.com/library/en-us/createdw/createdw_39z.asp?frame=true 1 page.
Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.
Data Warehouse Designer—Design Constraints and Unavoidable Realities, No design Problem in School was This Hard, Ralph Kimball, Sep. 3, 2002, 3 pages.
Data Warehouse Designer—An Engineer' s View—Its' Worthwhile to Remind Ourselves Why We Build Data Warehouses the Way We Do, Ralph Kimball, Jul. 26, 2002, 3 pages.
Data Warehouse Designer—Divide and Conquer, Build Your Data Warehouse One Piece at a Time, Ralph Kimball, Oct. 30, 2002, 3 pages.
Data Warehouse Designer—The Soul of the Data Warehouse, Part One: Drilling Down, Ralph Kimball, Mar. 20, 2003, 3 pages.
Data Warehouse Designer—The Soul of the Data Warehouse, Part Two: Drilling Across, Ralph Kimball, Apr. 5, 2003, 3 pages.
Data Warehouse Designer—The Soul of the Data Warehouse, Part Three: Handling Time, Ralph Kimball, Apr. 22, 2003, 3 pages.
Data Warehouse Designer—Two Powerful Ideas, The Foundation for Modern Data Warehousing, Ralph Kimball, Sep. 17, 2002, 3 pages.
Dawson, "NPRI's Powerguide, Software Overview" Call Center Magazine (Jun. 1993), p. 85.
Day et al.; "A Model for Presence and Instant Messaging," Network Working Group (Feb. 2000), available at http://wvvw.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.

DMReview—Business Dimensional Modeling: The Logical Next Step: Translating the BDM, Laura Reeves, published May 2004, 4 pages.
Doo-Hyun Kim et al. "Collaborative Multimedia Middleware Architecture and Advanced Internet Call Center," Proceedings at the International Conference on Information Networking (Jan. 31, 2001), pp. 246-250.
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:Rif.ps.gz, 1999, 8 pages.
E. Veerman, "Designing a Dimensional Model", date unknown, 38 pages.
G. Hellstrom et al., "RFC 2793—RTP Payload for Text Conversation," Network Working Group Request for Comments 2793 (May 2000), available at http://www.faqs.org/rfcs/rfc2793.html, 8 pages.
G. Wiederhold, "Mediation to Deal with Heterogeneous Data Sources", Stanford University, Jan. 1999, 19 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.
J.E. Bentley, "Metadata: Everyone Talks About It, But What is It?", First Union National Bank, date unknown, 5 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, date unknown; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
MIT Project Oxygen, Pervasive, Human-Centered Computing (MIT Laboratory for Computer Science) (Jun. 2000) pp. 1-15.
Multi-Dimensional Modeling with BW ASAP for BW Accelerator Business Information Warehouse, copyright 2000, 71 pages.
Presentation by Victor Zue, The MIT Oxygen Project, MIT Laboratory for Computer Science (Apr. 25-26, 2000) 9 pages.
Richard Shockey, "ENUM: Phone Numbers Meet the Net" www.cConvergence.com (Jul. 2001) pp. 21-30.
Rose et al.; "The APEX Presence Service," Network Working Group (Jan. 14, 2002), available at http://www.ietf.org/internet-drafts/draft-ietf-apex-presence-06.txt, 31 pages.
Stevenson et al.; "Name Resolution in Network and Systems Management Environments"; http://netman.cit.buffalo.edu/Doc/DStevenson/NR-NMSE.html; printed Mar. 31, 2003; 16 pages.
Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Multi Channel Product Authorization," (PA) Version 5.0, (Nov. 2003) (6 pages).
GEOTEL Communications Corporation Web site printout entitled "Intelligent CallRouter" Optimizing the Interaction Between Customers and Answering Resources., 1998, 6 pages.
Nortel—"Centrex Internet Enabled Call Centers," http://www.products.nortel.com/go/product_assoc.jsp?segId=0&parID=0&catID=-9191&rend_id . . . (Copyright 1999-2005) (1 page).

(56) References Cited

OTHER PUBLICATIONS

Microsoft Office Animated Help Tool, date unknown, 1 page.
"Still Leaving It to Fate?: Optimizing Workforce Management", Durr, William Jr., Nov. 2001.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
Data Warehouse—Surrogate Keys, Keep Control Over Record Identifiers by Generating New Keys for the Data Warehouse, Ralph Kimball, May 1998, 4 pages.
Andy Zmolek; "Simple and Presence: Enterprise Value Propositions," Avaya presentation, 16 pages, presented Jan. 24, 2002.
Berners-Lee et al.; "Uniform Resource Identifiers (URI); Generic Syntax," Network Working Group, Request for Comments 2396 (Aug. 1998), 38 pages.
Dawson et al.; "Vcard MIME Directory Profile," Network Working Group (Sep. 1998), available at http://www.ietf.org/rfc/rfc2426.txt?number=2426, 40 pages.
Fielding et al.; "Hypertext Transfer Protocol—HTTP/1.1," Network Working Group, Request for Comments 2068 (Jan. 1997), 152 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
Sarda, "Temporal Issues in Data Warehouse Systems", 1999, Database Applications in Non-Traditional Environments (DANTE'99), S. 27, DOI: 10.1109/DANTE.1999.844938.
Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.
Background of the Invention for the above-captioned application (previously provided).
Official Action for U.S. Appl. No. 10/861,193, mailed Sep. 18, 2008.
Official Action for U.S. Appl. No. 10/861,193, mailed Mar. 16, 2009.
"eGain's Commerce 2000 Platform Sets New Standard for eCommerce Customer Communications," Business Wire (Nov. 15, 1999)., 3 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
An Expert's Guide to Oracle Technology blog, My Personal Dictionary, Lewis R. Cunningham, posted Mar. 31, 2005, http://blogs.ittoolbox.com/oracle/guide/archives003684.asp, 4 pages.
ComputerWorld, ETL, M. Songini, at http://www.computerworld.com/databasetopics/businessintelligence/datawarehouse/story/. . . , copyright 2005, 5 pages.
CS 345: Topics in Data Warehousing, Oct. 5, 2004, 36 pages.
Data Warehouse Designer—TCO Starts with the End User, Ralph Kimball, May 13, 2003, http://www.intelligententerprise.com/030513/608warehouse1_1.jhtml?_requestid=598425, 3 pages.
Data Warehouse Designer Fact Tables and Dimension, Jan. 1, 2003, http://www.inteeigententerprise.com/030101/602warehouse1_1.jhtml, Ralph Kimball, 3 pages.
DEFINITY Communications System Generic 3 Call Vectoring/Expert Agent Selection (EAS) Guide, AT&T publication No. 555-230-520 (Issue 3, Nov. 1993).
Fundamentals of Data Warehousing—Unit 3—Dimensional Modeling, Fundamentals of Data Warehousing, copyright 2005—Evolve Computer Solutions, 55 pages.
Glossary—Curlingstone Publishing, http://www.curlingstone.com/7002/7002glossary.html, downloaded May 24, 2005, 11 pages.
Kimball, et al., "Practical Techniques for Extracting, Cleaning, Conforming, and Delivering Data." The Data Warehouse ETL Toolkit. 2004. Ch. 5, pp. 170-174.
Kimball, et al., "The Complete Guide to Dimensional Modeling." The Data Warehouse Toolkit. 2nd Edition, 2002. Ch. 11, pp. 240-241.
Snape, James, "Time Dimension and Time Zones." 2004. pp. 1-10. http://www.jamessnape.me.uk/blog/CommentView,gui,79e910a1-0150-4452-bda3-e98df.
The Importance of Data Modeling as a Foundation for Business Insight, Larissa Moss and Steve Hoberman, copyright 2004, 38 pages.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-Athena, Section 5—Company C520, p. 95, 1992.
"VAST™, Voicelink Application Software for Teleservicing®," System Manager User's Guide, Digital Systems (1994), pp. ii, vii-ix, 1-2, 2-41 through 2-77.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Foster, Robin, et al., "Avaya Business Advocate and its Relationship to Multi-Site Load Balancing Applications," Avaya, Inc., Mar. 2002, 14 pages.
"Learn the structure of an Access database", available at http://office.microsoft.com/en-us/access/HA012139541033.aspx, site updated Nov. 13, 2007, pp. 1-4.
Dillion, "Renaming fields and tracing dependencies", available at http://allenbrowne.com/ser-41.html, Nov. 2003, updated May 2006, 1 page.
Thayer Watkins, "Cost Benefit Analysis", 1999, San Jose State University Economics Department, Web Archive http://web.arch ive.org/web/19990225143131 /http://www.sjsu.edu/faculty/watkins/cba.htm.
U.S. Appl. No. 12/789,038, filed May 27, 2010, Bland et al.
U.S. Appl. No. 11/242,687, filed Oct. 3, 2005, Krimstock et al.
Official Action for U.S. Appl. No. 10/861,193, mailed Sep. 14, 2010.
Akitsu, "An Introduction of Run Time Library for C Program, the fourth round," C Magazine, Jul. 1, 1990, vol. 2(7), pp. 78-83.
Emura, "Windows API Utilization Guide, Points for Knowledges and Technologies," C Magazine, Oct. 1, 2005, vol. 17(10), pp. 147-150.
Examiner's Office Letter (including translation) for Japanese Patent Application No. 2007-043414, mailed Jul. 7, 2010.

\* cited by examiner

| | | 500a | 500b | 500c | 500d | 500e | 500f | 500g | 500h | 500i | 500j | 500k |
|---|---|---|---|---|---|---|---|---|---|---|---|---|
| 504 | Part | 1 | 2 | 3 | 4 | 5 | 6 | 7 | 8 | 9 | 10 | 11 |
| 508 | Pkey | 1 | 1 | 1 | 1 | 1 | 1 | 1 | 1 | 1 | 1 | 1 |
| 512 | contact | V | V | V | V | V | V | V | V | V | V | V |
| 516 | media start | 1 | 1:01 | 1:15 | 1:25 | 1:25 | 2:00 | 2:00 | 3:00 | 3:00 | 4:00 | 4:01 |
| 516 | end | 1:01 | 1:15 | 1:25 | 2:00 | 2:00 | 3:00 | 3:00 | 6:00 | 6:00 | 4:01 | 5:00 |
| 520 | participant | C | C | C | A | C | A | C | C | A | A | B |
| 524 | group fk | | | | | | | | | | | |
| 528 | state | created | qual | queued | alerting | alerting | active | active | inactive | inactive | initiating | alerting |
| 532 | mi | | | | | | | | | | 1 | |

*Fig. 5A*

| | | 500l | 500m | 500n | 500o | 500p | 500q | 500r | 500s | 500t | 500u | 500v | 500w | 500x |
|---|---|---|---|---|---|---|---|---|---|---|---|---|---|---|
| 504 | Part | 12 | 13 | 14 | 15 | 16 | 17 | 18 | 19 | 20 | 21 | 22 | 23 | 24 |
| 508 | Pkey | 1 | 1 | 1 | 1 | 1 | 1 | 1 | 1 | 1 | 1 | 1 | 1 | 1 |
| 512 | contact | V | V | V | V | V | V | V | V | V | V | V | V | V |
| 516 | media start | 4:01 | 5:00 | 5:00 | 6:00 | 6:00 | 6:00 | 6:30 | 6:45 | 7:00 | 7:00 | 7:00 | 8:00 | 8:00 |
| 516 | end | 5:01 | 6:00 | 6:00 | 6:30 | 7:00 | 7:00 | 7:00 | 7:00 | 7:00 | 8:00 | 8:00 | 8:01 | 8:00 |
| 520 | participant | A | B | A | B | A | C | B | A | B | C | C | B | C |
| 524 | group fk | | 2 | 2 | 3 | 3 | 3 | 3 | 3 | 3 | 4 | 4 | 4 | 4 |
| 528 | state | alerting | active | active | active | active | active | inactive | active | disc | active | active | disc | disc |
| 532 | mi | | | | | | | | | | | | | |

*Fig. 5B*

| Part | | 1 | 2 | 3 | 4 | 5 | 6 | 7 | 8 | 9 | 10 | 11 | 12 |
|---|---|---|---|---|---|---|---|---|---|---|---|---|---|
| | Pkey | 1 | 1 | 1 | 1 | 1 | 1 | 1 | 1 | 1 | 1 | 1 | 1 |
| | contact | | | | | | | | V | V | V | V | V |
| | media | Chat | Chat | Chat | Chat | Chat | Chat | Chat | | | | | |
| | start | 1 | 1:01 | 1:15 | 1:25 | 1:25 | 2:00 | 2:00 | 2:00 | 3:00 | 5:00 | 5:00 | 6:00 |
| | end | 1:01 | 1:15 | 1:25 | 2:00 | 2:00 | 8:00 | 8:00 | 5:00 | 5:00 | 8:00 | 8:00 | 6:01 |
| | participant | C | C | C | A | C | A | C | A | C | A | C | A |
| | group fk | | | | | 1 | 1 | 1 | 1 | 1 | 1 | 1 | |
| | state | created | qual | queued | alerting | alerting | active | active | active | active | inactive | inactive | initiating |
| | mi | 1 | 1 | 1 | 1 | 1 | 2 | 2 | 2 | 2 | 2 | 2 | 2 |

*Fig. 6A*

| | | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|
| | Pkey | 1 | 1 | 1 | 1 | 1 | 1 | 1 | 1 | 1 | 1 | 1 | 1 | 1 | 1 |
| | contact | V | V | V | V | V | V | V | V | C | C | V | V | V | V |
| | media | | | | | | | | | | | | | | |
| | start | 6:01 | 6:01 | 7:00 | 7:00 | 8:00 | 8:00 | 8:00 | 8:00 | 8:00 | 8:00 | 9:00 | 9:00 | 10:00 | 10:00 |
| | end | 7:00 | 7:00 | 8:00 | 6:30 | 8:00 | | 9:00 | 9:00 | | | 9:00 | 9:01 | 10:00 | 10:00 |
| | participant | B | A | A | B | A | B | B | C | B | C | B | C | B | C |
| | group fk | | | 2 | 3 | | | 3 | 3 | 3 | 3 | 3 | 3 | 3 | 3 |
| | state | alerting | active | active | active | transfer | wrapup | active | active | active | active | disc | disc | | |
| | mi | 2 | | 2 | | 2 | | 2 | 2 | 1 | 1 | 2 | 2 | 3 | 3 |

*Fig. 6B*

DATA MODEL OF PARTICIPATION IN MULTI-CHANNEL AND MULTI-PARTY CONTACTS

CROSS-REFERENCE TO RELATED APPLICATION

This application is a divisional of U.S. patent application Ser. No. 10/861,193, filed Jun. 3, 2004, now U.S. Pat. No. 7,953,859, issued May 31, 2011 which claims the benefits under 35 U.S.C. §119 of U.S. Provisional Patent Application Ser. No. 60/558,613, filed Mar. 31, 2004, of the same title and to the same inventors, which is incorporated herein by this reference.

FIELD OF THE INVENTION

The present invention is directed generally to contact center management and specifically to monitoring selected contact center events.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called call vectoring. Normally in present-day ACDs when the ACD system's controller detects that an agent has become available to handle a call, the controller identifies all predefined call-handling skills of the agent (usually in some order of priority) and delivers to the agent the highest-priority oldest-waiting call that matches the agent's highest-priority skill. Generally, the only condition that results in a call not being delivered to an available agent is that there are no calls waiting to be handled.

Most present-day contact-distribution algorithms focus on being "fair" to contactors and agents. This fairness is reflected by the standard first-in, first-out call to most-idle-agent assignment algorithm. Skills-based routing improves upon this basic algorithm in that it allows each agent to be slotted into a number of categories (splits) based on the agent's skill types and levels.

The primary objective of contact center management, including call-distribution algorithms, is to ultimately maximize call center performance and profitability. That may involve minimizing cost, maximizing call throughput, and/or maximizing revenue, among others. For example, when a new call arrives, the call should be handled by an agent who either has the ability to produce the most revenue or can handle the call in the shortest amount of time. Also, when an agent becomes available to handle a new call, the agent should handle either the call that has the possibility of generating the most revenue or the call which the agent is most efficient in handling.

To realize the objectives of optimized contact center performance and profitability, various algorithms have been developed to monitor and track selected contact center events. For example, the Services for Computer Supported Telecommunications Applications (CSTA) standard 269 of the European Computer Manufacturers Association (ECMA) defines relationships among calls, connections, and devices. The CSTA standard specifies that the identification of a call changes when the call is conferenced or transferred and that a "call", whether it represents voice, email, or messaging, involves only a single channel. The CSTA standard does not specify how calls, connections, and devices are to be tracked for reporting. It only specifies the states of calls, connections and devices before and after the operations it defines and the events that are emitted as a result of the operations. Current Avaya™ Customer Resource Management™ products, such as Basic Call Management System or BCMS™, Call Management System or CMS™, and Operational Analyst™, have data models that provide only limited details. BCMS has only a summary of the total time that calls spent on hold at an agent. It has neither further detail on the calls held nor information on conferences and transfers in its call record structure. CMS has more detailed information on held calls, conferences, and transfers in its call record structure. CMS tracks which agent held a call, how many times and for how long, when there is more than one agent on a call. However, CMS does not record when the call was put on hold by which participants and when the call was removed from hold by each party. Avaya's Multi-Media Contact Center™ tracks summary data, in a manner similar to CMS, and has a data model supporting detailed tracking of contacts as well. The data model does not support tracking for conferences involving multiple external parties nor for multi-channel contacts. In short, none of BCMS, CMS, or the Multi-Media Contact Center addresses multi-channel or multi-state contact tracking, since they are generally directed to voice contacts. Finally, existing data warehouse models in the data warehousing industry provide, at most, only limited information on contacts. Existing models tend to focus on customer and billing information from sales and marketing systems but typically do not contain structures that support interaction details. The models fail to provide the granular details that will allow contact centers to analyze the details of individual contacts.

There is a need for a contact monitoring/tracking algorithm that provides details on contact history in a contact center, including details on changes in state and channel during the customer/contact center interaction.

SUMMARY OF THE INVENTION

These and other needs are addressed by the various embodiments and configurations of the present invention. The present invention is generally directed to a method for tracking multi-channel and/or multi-party contacts. A "contact" refers to an interaction between selected parties/entities over one or more channels. The parties/entities can be human, such as a customer, agent, and supervisor, or nonhuman, such as an Interactive Voice Response unit, a Web server, content analyzer, email server, and the like.

In one embodiment, a contact center is provided that includes:

(a) a plurality of resources (e.g., human agents, automated entities such as an IVR unit, etc.) for servicing a plurality of inbound and/or outbound customer contacts;

(b) a switching fabric (e.g., a switch and/or server) for configuring a communication session (e.g., a live voice call, instant messaging session, and chat session) between a first customer and a first resource for servicing of the first customer's contact by the first resource; and (c) a contact tracking agent that, during the servicing of the first customer by the first resource, monitors the first resource's endpoint for the occurrence of one or more of (i) a change in contact state, (ii) the connection of the first resource and the first customer through a new communication channel, and (iii) the addition of a party to and/or removal of a party from the communication session and, when one or more of the above events occurs, terminates a first contact part and creates a second contact part.

The channel/communication medium used by the contact refers to a communication technique, pathway, or method as defined, governed, or enabled by one or more selected protocols (e.g., a packet-based protocol such as TCP/IP, RTP, and RTCP, an asynchronous transfer mode protocol, and a frame relay protocol or a circuit-switched protocol), algorithms (e.g., software applications, such as E-mail, Web browsers, instant messaging, text chat, Integrated Services Digital Network or ISDN, QSIG, DPNSS, SIP, H.323, VDP, and SGCP, etc.) switches or routers, and/or communication medium (e.g., twisted wire, coaxial cable, fiber optic cable, wireless, cellular, and PCS™ of U.S. Sprint). For example, voice-only wired telephone communications over the PSTN represent one channel, voice-over-IP telephony yet another channel, voice-only wireless telephone communications a further channel, non-voice IP telephony (e.g., a text web chat) a further channel, multi-media telephony (e.g., a video stream, an audio/video call, etc.) over the PSTN a further channel, instant messaging over the data network a further channel, a Web conference over the Internet a further channel, e-mail over the data network a further channel, a facsimile over a circuit-switched or packet-switched medium a further channel, etc.

The "state" of a contact refers to the existing or current condition or status of a contact, such as active, inactive, enqueued (or in queue), ringing, on hold, and, terminating.

A "contact part" represents a single party, contact state and/or communication channel in a contact or communication session. Typically, the contact part is based collectively on a single party, contact state, and channel. A contact part can thus be the smallest measurable part of a communication. Typically, a new contact part is created, and a prior contact part terminated, whenever a monitored party and/or channel is added or dropped and/or experiences a state change. In contrast, the contact maintains its identification throughout its lifetime, regardless of the number of parties and channels that are involved. At least one (and probably more) contact part(s) is/are created for every party/endpoint in the contact, including customers, agents, automated resources, and any other entity that participates in the contact. In other words, each endpoint to the contact or communication session is commonly monitored independently and separately. Thus, a first endpoint in a communication session can have a first contact part and a second endpoint in the same communication session can have a second contact part that temporally overlaps the first contact part. The use of a contact part can allow tracking the time that each party in the contact spends communicating and on hold (or the equivalent) as well as providing the complete picture of who joined the contact, at what point, and for how long.

Using the concept of the "contact part", other data structures can be created to provide more detail in tracking the contact. For example, a "contact part related" refers to the relationship of two contact parts. "Contact part related" shows the reason for the relationship, particularly if one contact part generated the next contact part. It is typically used to capture the cause and effect between two contact parts. A "contact media interaction" refers to the media-specific characteristics of a contact.

The present invention can provide a number of advantages over the prior art. For example, the contact part provides a complete and detailed record of all states, participants, and channels involved in a given contact from the time the contact reaches or is launched by a contact center until it is terminated. The contact part and related entities thus allow accurate and detailed reporting of complex interactions with regard to the involvement of each party and communication channel. Examples of such contacts include conference calls where parties join and leave the conference during the course of the contact and voice chat sessions where parties add and drop the voice channel to an existing Web chat. As noted, conventional architectures generally provide either summary reporting (such as the number of times an agent held a call) or detailed reporting only on certain parties involved in such interactions. The prior does not track multi-party contacts. Additionally, the present invention can support reporting at higher levels with less detail that may be more comprehensible to users of reports than the low-level detail captured. The ability to accurately track multi-party and multi-channel contacts can enable contact center administrators and managers to identify not only more effective and/or inexpensive ways to service customer contacts but also more effective ways to manage limited contact center resources.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIGS. 5A and B depict a first example of an operational embodiment of the contact tracking agent; and FIGS. 6A and B depict a second example of an operational embodiment of the contact tracking agent.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
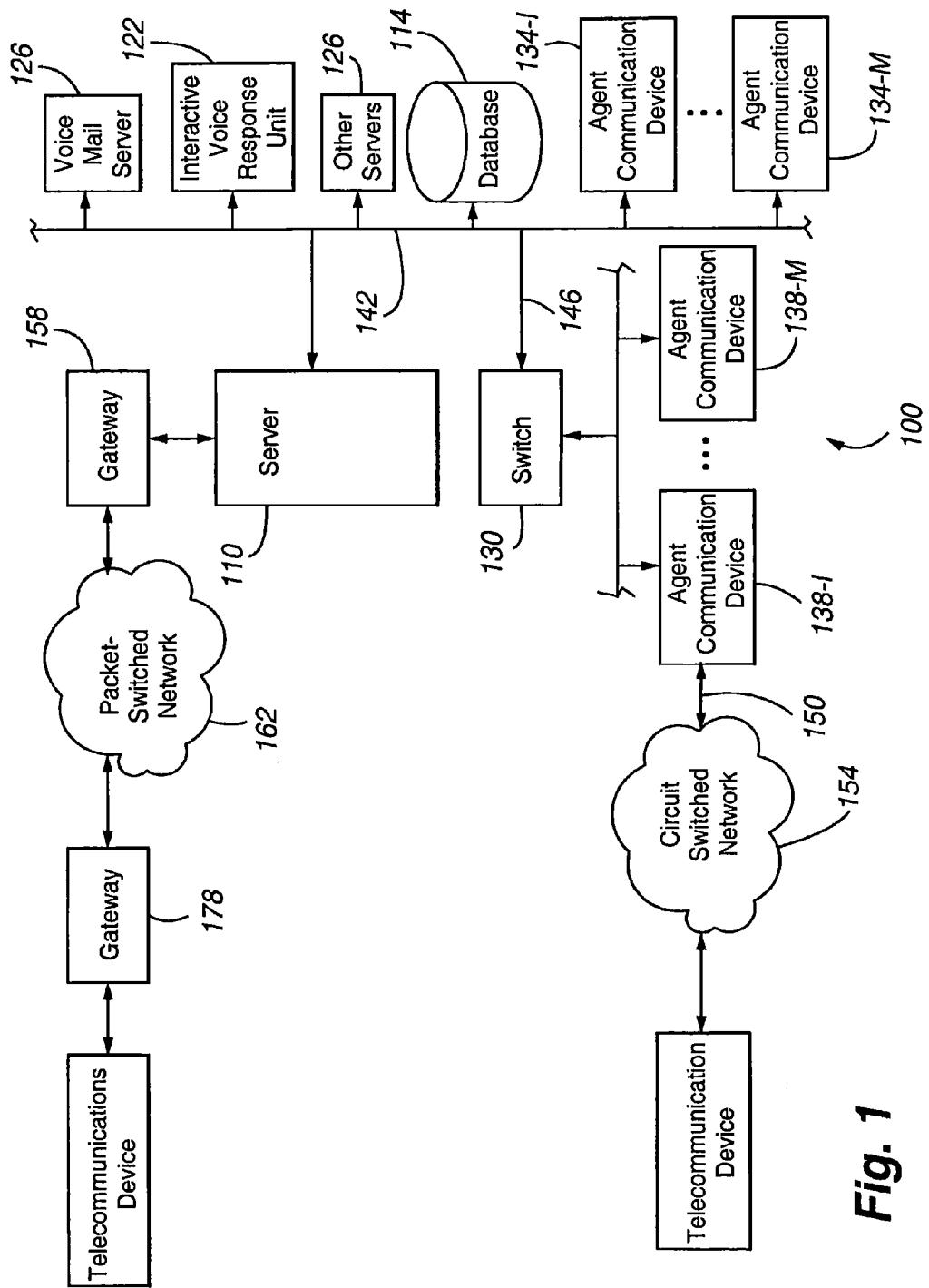
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Voice Response unit or IVR 122, and other servers 126, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

Figure 2:
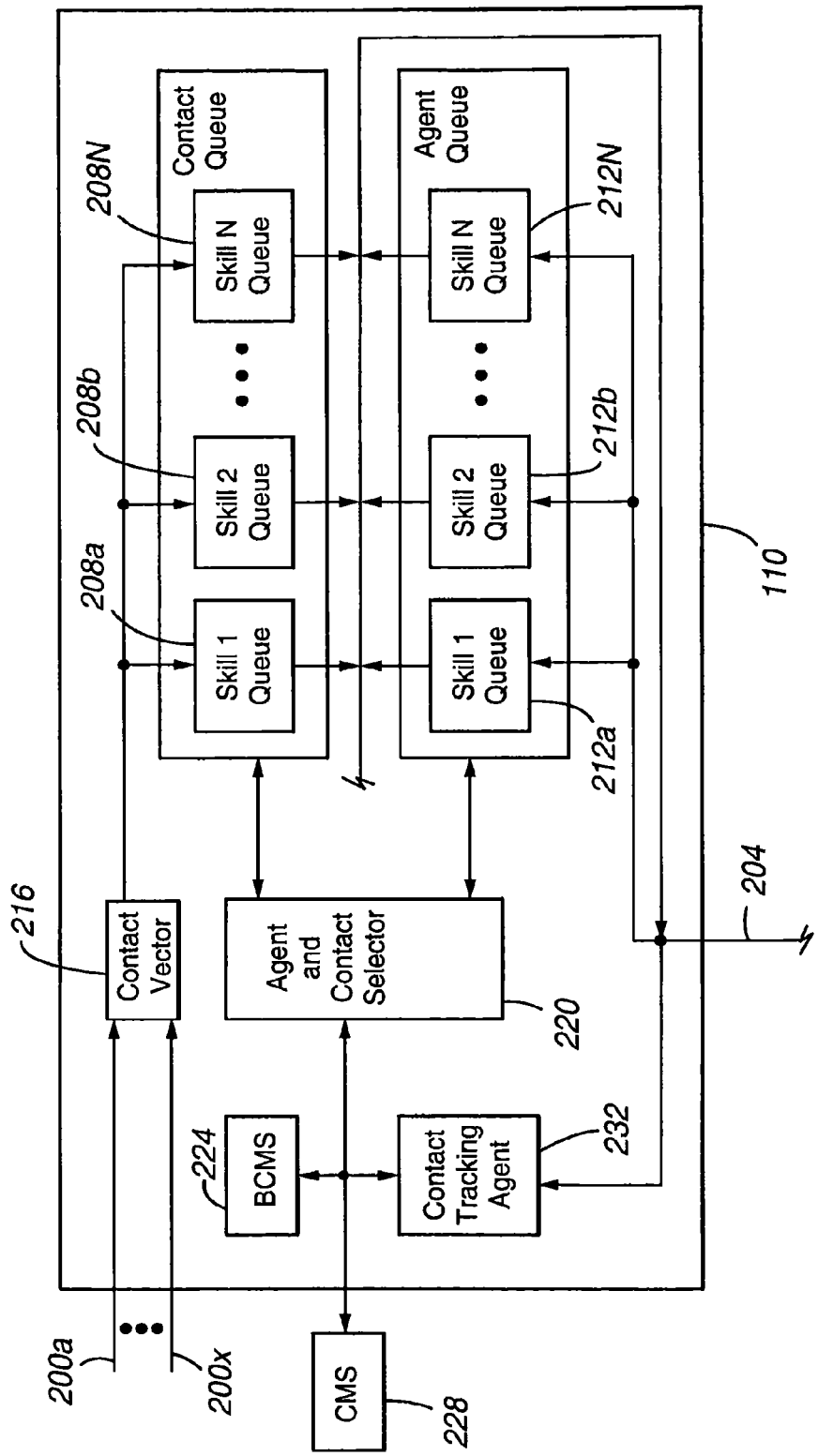
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include a Basic Call Management System™ or BCMS 224 and a Call Management System™ or CMS 228 that gathers call records and contact-center statistics for use in generating contact-center reports. CMS and BCMS and any other reporting system, such as Operational Analyst™ will hereinafter be referred to jointly as CMS 228.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, Nov. 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner. The second telecommunication devices can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second telecommunication devices, i.e., the invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent. The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to the invention, included among the programs executing on the server 110 is a contact tracking agent 232. The agent 232 is stored either in the main memory or in a peripheral memory (e.g., disk, CD ROM, etc.) or some other computer-readable medium of the center 100. The agent 232 collects detailed information on incoming and/or outgoing contacts in the contact center using the concept of a "contact part". A "contact" is composed of one or more contact parts and maintains its identification throughout its lifetime, regardless of the number of parties, states, and channels involved. The actions of each party or endpoint are monitored independently to identify the addition/removal of parties and/or channel and state changes. The collected granular contact details can be analyzed by the CMS and provided to contact center management in a user configurable reports that can be used to maximize contact center efficiency.

A selected endpoint to a contact generally has one or associated contact parts during the course of the contact. For a selected endpoint, a new contact part is created and a current contact part is terminated when a party and/or channel is added and/or dropped and a state changes. Examples of activities or events that will result in multiple contact parts for a contact, include the contact changes state from "created" to "qualification", a text chat contact becomes voice chat by adding voice transfers, an additional party is conferenced into an existing contact, and an existing contact is transferred from one agent to another agent.

The concept of a contact part gives rise to several related data entities, including contact part related, contact participation group, contact part purpose, contact part related reason, contact media interaction, contact media interaction disposition, contact part qualifier, contact part delivery source, contact part disposition, contact part routing method, contact part wait treatment, contact qualifier, dialed number purpose, disposition, media, party login, routing construct, routing construct contact part, state reason, step, and step contact part.

Figure 3A:
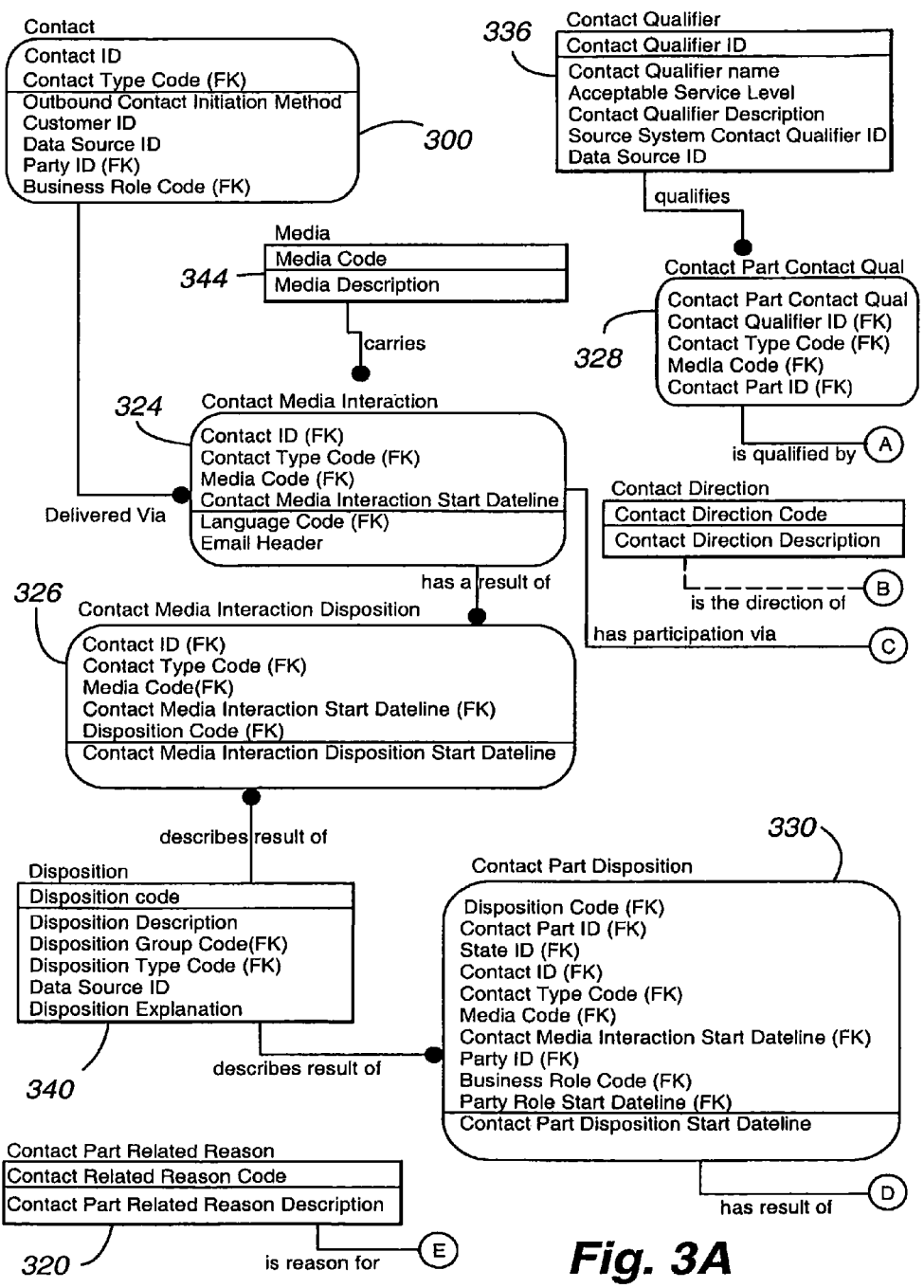
FIGS. 3A, 3B and 3C are collectively a third normal form data model depicting the data structures of an embodiment of the present invention.
Figure 3B:
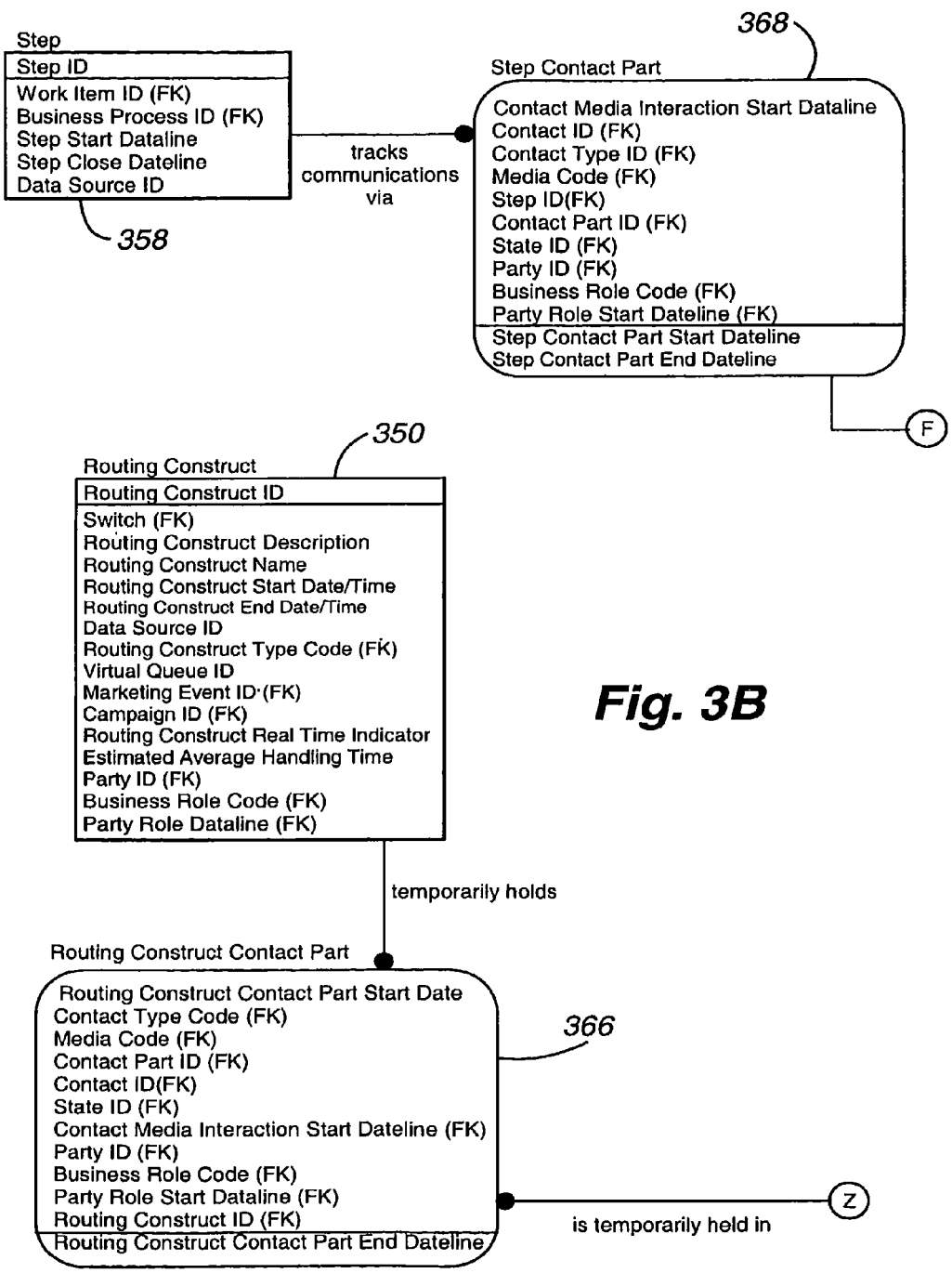
Figure 3C:
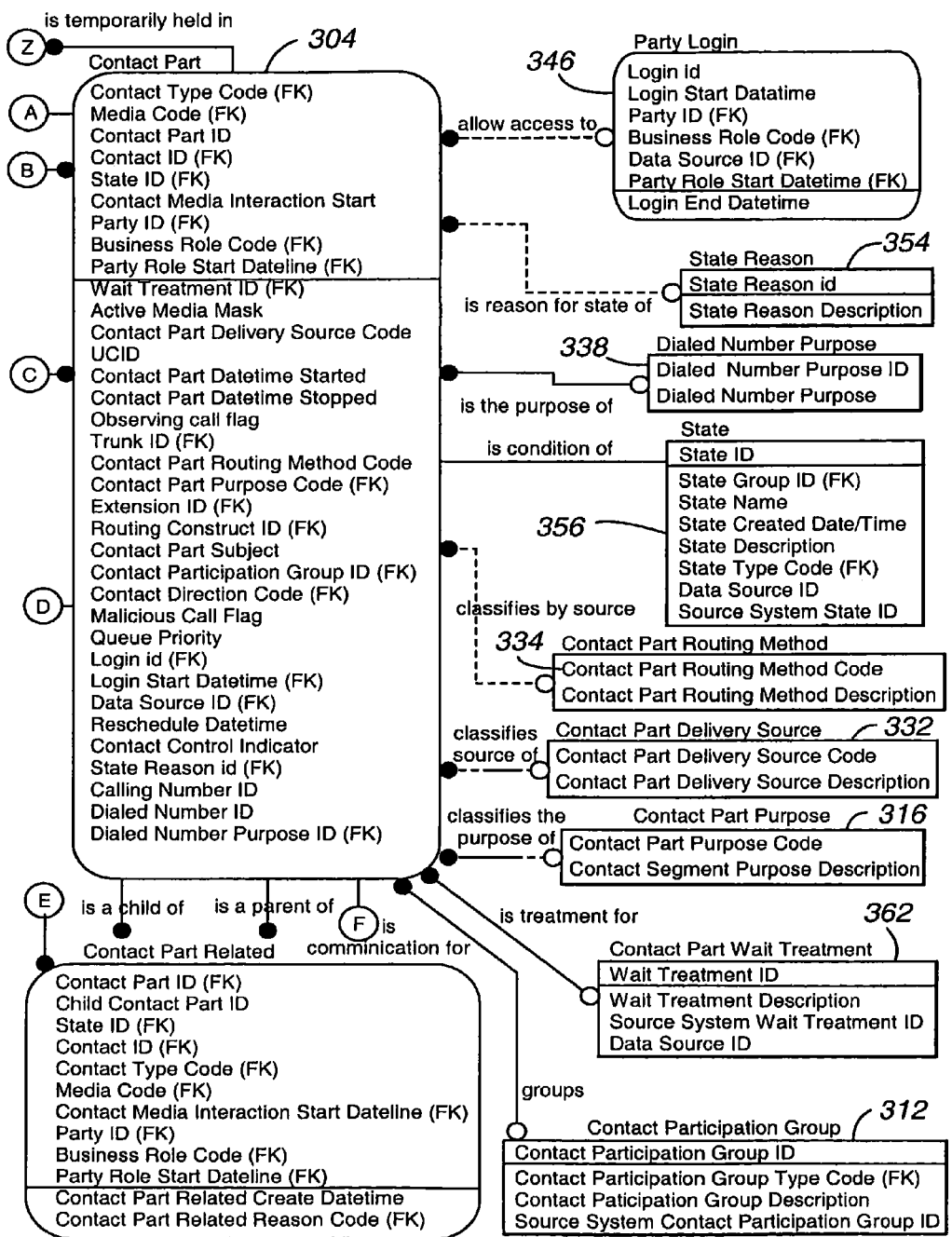

The relationships among these objects are illustrated in FIGS. 3A, 3B and 3C, which are collectively a third normal form data model of the objects and their respective attributes. As will be appreciated, interconnecting dashed and solid lines indicate the related entities and the type of relationship.

As can be seen from the figures, the attributes for contact 300 include contact ID (an internally generated unique identifier of a contact); contact type code (which identifies the type of contact), outbound contact initiation method, customer ID (the identifier(s) of the customer(s) engaged in the contact), data source ID, party ID (the identifier(s) of the parties to the contact), business role code, party role start datetime (the date/time that the system recognizes that the party may play a role in interactions with the enterprise), contact direction code, and contact direction description.

The attributes for contact part 304 include contact type code, media code (which identifies the type of media/medium used during the contact part), contact part ID (which uniquely identifies the contact part), contact ID (which uniquely identifies the contact of which the contact part is a subpart), state ID (which identifies the state of the corresponding monitored endpoint to which the contact part corresponds), contact media interaction start datetime (the date/time that the contact media interaction started), party ID, business role code, party role start datetime, wait treatment ID, active media mask (a mapping of possible media types and their direction), contact part delivery source code, UCID (Universal Call Identifier), contact part datetime started (the date/time that the contact part started), contact part datetime stopped (the date/time that the contact part stopped), observing call flag, trunk ID, contact part routing method code, contact part purpose code, extension ID, routing construct ID, contact part subject (a text description of the subject of the message), contact participation group ID, contact direction code, malicious call flag, queue priority, login ID, login start date/time, data source ID, reschedule datetime (time stamp indicating when the contact connected to this part will be rescheduled to make another attempt), contact control indicator, state reason ID, calling number ID (the number dialed by the originator of the contact), and dialed number purpose ID.

A contact part related 308 refers to or describes the relationship of two contact parts. It shows not only the relationship between two related contact parts but also the reason for the relationship, particularly when a first contact part generated (or immediately preceded) a second contact part. For example, the contact part related would link or associate first and second contact parts that emanated from the same contact. The attributes for contact part related 308 include contact part ID (which uniquely identifies the associated contact part (s)), child contact part ID (which uniquely identifies the contact part(s) (if any) immediately succeeding or generated from the subject contact part), state ID, contact ID, contact type code, media code, contact media interaction start datetime, party ID, business role code, party role start datetime, contact part related create datetime (the date/time when the contact part related was created), and contact part related reason code.

A contact participation group 312 identifies the simultaneous participation of multiple parties in a contact. It also distinguishes between instances of simultaneous participation in a contact. For example, a single contact may involve one or more conferences between differing sets of individuals. The contact participation group identifies all of the contact parts that were part of or emanated from the same contact. The contact part differs from the contact participation group in that the contact participation group shows the relationship of all contact parts in a group or set of contact parts, such as the participation of five parties in the same conference call or if the same contact involves multiple conferenced calls. All of the members in a group of contact parts are included in the contact participation group with a reason for their participation in the conference. Contact part related, in contrast, may show that the relationship between the hosting party's contact part and one of the conferee's contact part had a reason of added to conference or dropped from the conference for the relationship. By way of illustration of the differences between the two objects, when a party is added to a conference, the party will join the existing contact group that represents the same conference, and a contact part related instance is created to show that that individual contact part was added to the contact part that represents the host of the conference. The attributes for contact participation group 312 include contact participation group ID (a code uniquely identifying the associated contact participation group), contact participation group type code (a code corresponding to the type of contact participation group (e.g., multi-party conference)), contact participation group description (a text description of the contact participation group and is generally used to provide the business context in relation to the specific contact), and source system contact participation group ID.

Contact part purpose 316 classifies the purpose of the contact part, such as business, and personal, and contact part related reason 320 provides the reason that a first contact part is related to a second contact part, such as conference, and transfer. The attributes for contact part purpose 316 include contact part purpose code (which identifies the corresponding purpose of the contact part) and contact segment purpose description (which is a text description of the contact segment purpose). The attributes for contact part related reason 320 include contact part related reason code (which identifies the corresponding contact part related reason) and contact part related reason description (which is a text description of the reason for contact part relationships).

Contact media interaction 324 describes the media-specific characteristics of a contact. When there is more than one medium or sets of media associated with a given contact at different times, there is typically more than one contact media interaction associated with the contact. There may also be more than one contact media interaction for the same medium during a contact when the use of the medium is temporally discontinuous during the contact. By way of example, for email it is allowed and probable that there will be more than one media interaction using the same medium (email) for a single contact. This is possible because of tracking information that is carried in the email subject line that links "sends" with "replies". A media interaction starts when at least one party begins using a medium to process a contact. The media interaction continues as long as any party involved in the contact is using the medium continuously. The media interaction ends when all parties involved in the contact are no longer using the medium. The attributes for contact media interaction 324 include contact ID, contact type code, media code, contact media interaction start datetime (the date/time that the contact media interaction started), language code, email header, email subject, email text, voice calling telephone number (the number of the calling telephone), voice called number, chat username, media protocol, email tracking number (an identifier used to track a thread of emails), email message ID (a unique identifier of an email message), and contact media interaction stop datetime (the date/time that the contact media interaction stopped).

Contact media interaction disposition 326 is the disposition of an instance of using a specific media as part of a contact. For example an email is actually an extended conversation that the contact can stop and resume as a different contact when some action is taken. At each of these points, the Electronic Data Unit or EDU retires. So for example when an agent sends a question to a Subject Matter Expert or SME agent the email is completed until they get a response back. The task is then recreated as a different contact. What the contact media interaction disposition is intended for is for the transient state of the email at the end of the specific interaction. The attributes for contact media interaction disposition 326 include contact ID, contact type code, media code, contact media interaction start datetime (the date/time that the contact media interaction started), disposition code (which identifies the corresponding disposition), and contact media interaction disposition start datetime (the date/time that the contact media interaction disposition occurred).

Contact part contact qualifier 328 is the assignment of abilities or characteristics to an instance of a party taking part in a contact, and contact part delivery source 332 is the source of the contact as it relates to an enterprise network. A contact may have qualifiers before being assigned to a routing construct, and the contact may never be assigned to a routing construct. The contact part delivery source identifies whether the contact was generated from within the organization or from some external point. Examples of contact part delivery source include "internal" and "external". The attributes for contact part contact qualifier 328 include contact part contact qualifier start datetime (the date/time that a qualifier applies to a contact part), contact qualifier ID, contact type code, media code, contact part ID, contact ID, state ID, contact media interaction start datetime, party ID, business role code, and party role start datetime (the date/time that a party may play a role in interactions with the enterprise network). The attributes for contact part delivery source 332 include contact part delivery source code and contact part delivery source description Contact part disposition 330 refers to the business result of a contact part, such as sale made, order place, and abandoned from hold, and contact part routing method 334 is the source of the contact part. Examples of sources include transferred from another agent, a direct call to an agent, transferred from an outbound dialer, and routed by an ACD. The attributes for contact part disposition 330 include disposition code, contact part ID, state ID, contact ID, contact type code, media code, contact media interaction start datetime, party ID, business role code, party role start datetime, and contact part disposition start datetime (the date/time that the system recorded a contact part disposition). The attributes for contact part routing method 334 include contact part routing method code (which identifies the corresponding contact part routing method) and contact part routing method description (which is a text description of the routing method used for the contact part).

Contact qualifier 336 refers to a characteristic, skill or ability that classifies an individual in terms of handling of a contact. The qualifier may be the ability of the agent to handle customers with a characteristic or the characteristic as it applies to the customer. Qualifiers are used to segment customers and to discriminate among customers in the assignment of processing resources. The attributes for contact qualifier 336 include contact qualifier ID, contact qualifier name, acceptable service level, contact qualifier description, source system contact qualifier ID, and data source ID.

The dialed number purpose 338 refers to the business purpose assigned to the dialed number. For example, 1-800-555-1212 is assigned to platinum customers who were offered a special discount on product X. The attributes for dialed number purpose 338 include dialed number purpose ID and dialed number purpose.

Disposition 340 is a description of the business value of the result of the interaction. Examples include successful contact, failed contact attempt, sale made, order placed, and the like. The attributes for disposition 340 include disposition code, disposition description (a text description of the disposition), disposition group code, disposition type code, data source ID, and disposition explanation (a free form text description of the disposition to allow parties to enter additional discussion that explains the business result of a call).

Media 344 refers to the category of transport used for a contact. Examples include email, postal, voice, Web, and the like. The attributes for media 344 include media code, media description (a text description of the media), last name (the surname of the party), title (the title of the party), name type code, data source ID, and preferred name (the preferred name of the party).

Party login 346 refers to the logins used a party to access systems within the enterprise. The attributes for party login 346 include login ID, login start datetime, party ID. business role code, data source ID, party role start datetime, and login end datetime.

Routing construct 350 refers to a logical or physical location for the collection and routing of contacts to agents or to other routing constructs. Routing constructs include a hunt group, an extension group, a split, a skill, a service class, a queue, a job, and a VDN. The attributes for routing construct 350 include routing construct ID (which identifies the corresponding routing construct), switch ID (which identifies the routing switch), routing construct description, routing construct name, routing construct start date/time, routing construct end date/time, data source ID, routing construct type code, virtual queue ID, marketing event ID, campaign ID, routing construct real time indicator, estimated average handling time, party ID, business role code, and party role start datetime.

State reason 354 refers to the reason that a state 356 exists or comes into being. It is often used to provide additional explanation surrounding the transition to state. For example, a contact state of "terminated", may occur due to an abandon, a disconnect, a transfer, or an email dismissal. In the example, "abandon", "disconnect", etc. will be the state reason. The attributes for state reason 354 include state reason ID and state reason description (a text description of the state reason). The attributes for state 356 include state ID, state group ID, state name, state created date/time (the date/time that the system recorded a new state), state description (a text description of the state), state type code, data source ID, and source system state ID.

Step 358 is the smallest unit of work in the business process hierarchy. A step may be any executable action taken within the system by a party that can be administered and/or recorded. It may span time, work and multiple contacts. Step 358 is the instance of the lowest level of a business process taking place. In other words, a step contains the details that result from discrete business activity. Examples of steps include process Joe Smith's individual loan application, provide standard product information, check Joe Smith's credit status, and communicate the decision to Joe Smith. The attributes for step 358 include step ID (which identifies the corresponding step), work item ID (which identifies the corresponding work item), business process ID (which identifies the corresponding business process), step start datetime (the date/time that the system records the existence of a step), step close datetime (the date/time that the system recognizes that the step is closed), and data source ID.

Contact part wait treatment 362 refers to the wait treatment applied to the participant during a selected contact part; routing construct contact part 366 identifies the use of a routing construct to queue or deliver a contact part; and step contact part 368 refers to the association between a contact part and a step. Step contact parts record the details of a communication that may take place in the processing of a step. A single contact may be associated with many steps, and a step may be associated with many contact parts. As will be appreciated, other activity that does not require communication may occur in the processing of a step. The attributes for contact part wait treatment 362 include wait treatment ID (which identifies the corresponding wait treatment), wait treatment description (which is a text description of the wait treatment), source system wait treatment ID, and data source ID. The attributes for routing construct contact part 366 include routing construct contact part start datetime (the date/time that a contact part begins to be routed via a routing construct), a contact type code, a media code, a contact part ID, a contact ID, a state ID, a contact media interaction start datetime, a party ID, a business role code, a party role start datetime, a routing construct ID, a routing construct contact part end datetime (the date/time that a contact part's routing via a routing construct ends). The attributes for step contact part 368 include contact media interaction start datetime, contact ID, contact type code, media code, step ID, contact part ID, state ID, party ID, business role code, party role start datetime (the date/time that a party may play a role in interactions with the enterprise), step contact part start datetime (the date/time that the system becomes aware that a contact part was associated with a step), and step contact part end datetime (the date/time that the system becomes aware that a contact part's association with a step ended).

Figure 4:
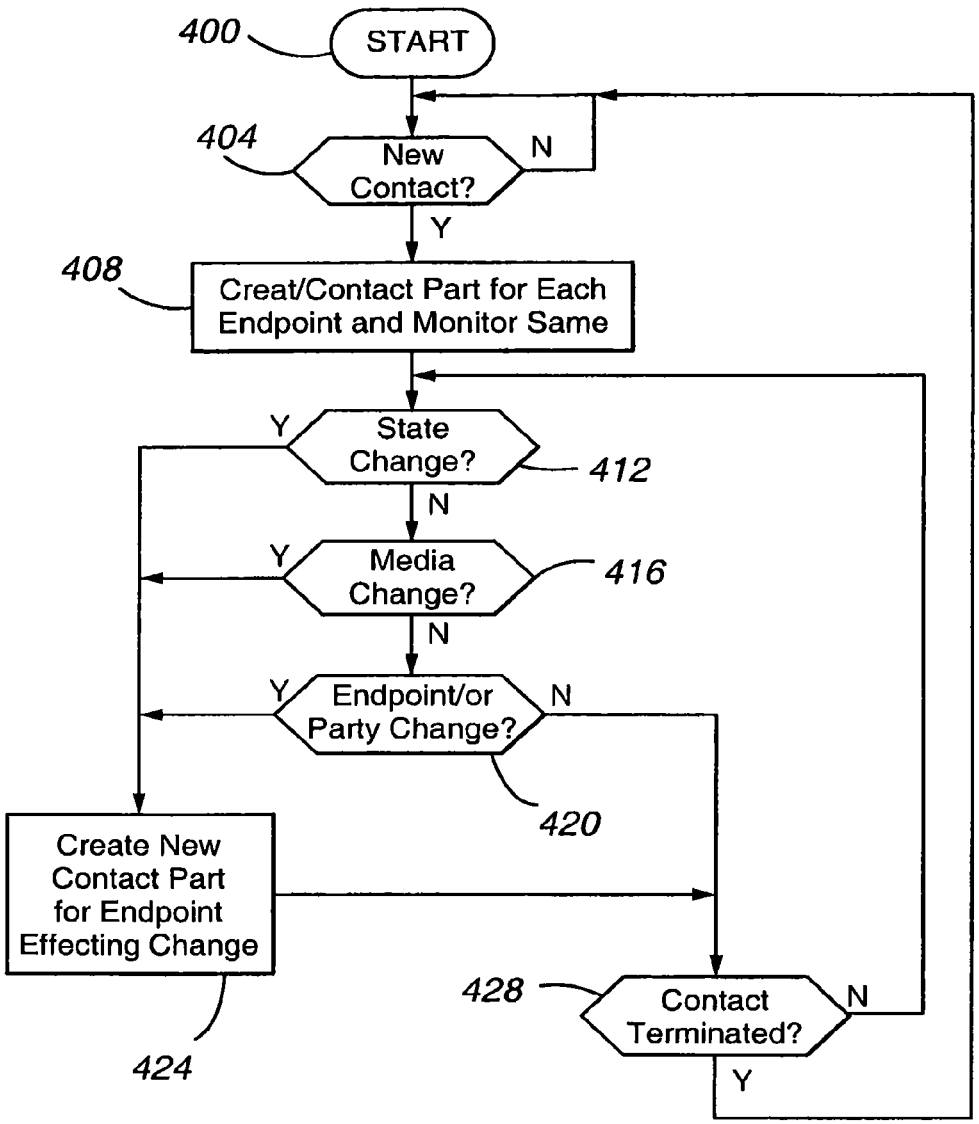
FIG. 4 is a flow chart depicting an operational embodiment of the contact tracking agent.

The operation of the contact tracking agent 232 will now be described with reference to FIG. 4.

In step 400, the agent 232 initializes all pertinent variables.

In decision diamond 404, the agent 232 waits for a new contact to be received by the contact center 100. It is important to note that a "contact" includes an attempt to communicate between a party inside or outside of a contact center and a party inside the contact center. The attempt may or may not be successful. The contact normally begins when a party inside the contact center initiates an attempt to communicate (e.g., dials a call, sends an email, etc.) or when a party outside the center 100 reaches a measured or monitored entity in the center (e.g., a VDN, Web page, email server, etc.). The contact includes wrap up time. The contact is finished when the last party terminates participation and completes any wrap up work associated with the communication.

When a new contact is detected, the agent 232 in step 408 creates a contact part for each monitored endpoint and proceeds with monitoring each of the endpoints. In decision diamonds 412, 416, 420, respectively, the agent 232 determines if a change in state, media or party (endpoint) has taken place. If so, the agent 324, in step 424, creates a new contact part for the endpoint effecting the change. Typically, the contact part for the other endpoint is unaffected by the change. In other words, a change only impacts the monitored endpoint experiencing the change. If no change is detected or after step 424 is completed, the agent 232 determines, in decision diamond 428, whether the contact has terminated. If not, the agent 232 returns to decision diamond 412. If so, the agent 232 proceeds to decision diamond 404 and awaits a next (new) contact.

To illustrate the operation of the agent 232 and the data objects in the data model, examples will now be discussed.

A first example is shown in FIGS. 5A and B. Columns 500a-x correspond to contact parts. Row 504 comprises contact part identifiers, row 508 the contact identifier of which the contact parts are members, row 512 the media type (with "V" indicating a live voice communication such as a telephone connection or Voice Over IP), rows 516 and 520 the start and stop times, respectively, of each contact part 500a-x, row 524 the identity of the participant (with "A" being a first agent, "B" a second agent, and "C" the customer), row 528 the use of a multi-party conference, and row 532 the state of the monitored endpoint.

With reference to FIG. 5A, the customer telephone call is received by the contact center, such as by being assigned a VDN, and contact part 500a is created for the customer endpoint making the contact. The state of the call changes to "qualification", which represents processing of the call to select an appropriate resource to service the call. A second contact part 500b is created as a result of the state change. The call state then changes to "queued" and a third contact part 500c is created.

When the call reaches the head of the queue, the endpoint of the selected agent, namely agent A, is contacted and has the state "alerting" indicating that the agent's phone is ringing. A fifth contact part 500d is created that corresponds to the endpoint of agent A. AT the same time, the state of the customer's endpoint changes from "queued" to "alerting", indicating that the customer can hear a ring tone in his phone as the agent's endpoint is rung.

The agent answers the call and his state changes from "alerting" to "active" in a sixth contact part 500e, and the customer's state also changes from "alerting" to "active" in a seventh contact part 500f.

After a short discussion, the agent determines that the assistance of a second agent, namely agent B, is needed. The first agent places the customer on hold while he contacts the second agent. This sequence of events is reflected in the eighth through the twelfth contact parts 500g-k in which the customer's status changes to "inactive" and the first agent's status changes to "inactive", "initiating", and "alerting". A contact part 500j is created for the second agent and corresponds to the "alerting" state.

The second agent answers the call so that his and the first agent's respective states each change to "active". The first agent then joins the customer into the communication by removing the customer from hold. This is reflected in contact parts 500l-p.

The second agent places the other parties on hold as reflected by contact part 500q, while the other parties remain connected and active as reflected by contact part 500r.

The first agent disconnects from the call as shown by contact part 500s, leaving the customer on hold with the second agent.

The second agent takes the customer off hold in contact parts 500t and u such that both the second agent and customer are "active".

Finally, both the second agent and customer disconnect in contact parts 500v and w, respectively.

The second example of FIGS. 6A and B depict contact parts resulting from a change in media. In contact parts 600a-g, the customer and first agent are engaged in a chat session. In contact parts 600h-i, the customer and agent change media to live voice. In contact parts 600q and r, the first agent transfers the contact to the second agent and wraps up his part of the contact. In contact parts 600 s and t, the second agent and customer are engaged in a live voice communication. In contact parts 600u and v, the second agent and customer are engaged in a chat session. Finally, in contact parts 600w and x the second agent and customer disconnect.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The agent can be configured to obtain more detailed information about the remote party's endpoint. In the typical implementation, the agent infers or assumes information about the remote party due to a lack of information from the remote party's endpoint/network about parties, states, and media. For example, the remote endpoint could conference in another party or transfer the call to another endpoint without the knowledge of the tracking agent.

Any other suitable contact tracking algorithm may be employed. As will be appreciated, the algorithms of FIG. 4 is only exemplary and not intended to be exclusive or limiting. In particular, the contact tracking agent can be configured to track independently one or more of party, media, and state. Thus, the agent can create contact parts for only party changes, for only media changes, for only state changes, or for a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A tangible and non-transient memory in a contact center, the contact center comprising a plurality of resources operable to service a plurality of contacts, the plurality of resources corresponding to a plurality of contact center endpoints and the plurality of contacts corresponding to a plurality of customers and customer endpoints, comprising:
a first collection of data structures corresponding to a contact, the first collection of data structures comprising a contact identifier identifying a corresponding contact, wherein the contact identifier is associated with one of the plurality of customers; and
a second collection of data structures corresponding to a first contact part and a second contact part, the second collection of data structures comprising the contact identifier, a state identifier that identifies a state of a monitored endpoint, and a first contact part identifier and a second contact part identifier that identifies the first contact part and the second contact part respectively, wherein the first contact part represents a first part of the contact, the second contact part represents a second part of the contact, and the contact identifier uniquely identifies the contact of which the first contact part and the second contact part are a subpart, wherein the first contact part is for a text media contact from the monitored endpoint and the second contact part is for a voice media contact from the monitored endpoint and wherein the state identifier identifies a change in state or an overlap between the text media contact and the voice media contact.

2. The memory of claim 1, wherein the first collection of data structures comprises a party identifier associated with a first resource.

3. The memory of claim 1, wherein the first contact part is one of a plurality of contact parts representing the contact.

4. The memory of claim 1, wherein the second collection of data structures comprises a media code identifying a type of media used during the first contact part, and a business role code identifying a role of a party associated with a monitored endpoint.

5. The memory of claim 4, wherein the second collection further comprises a child contact part identifier identifying a second contact part related to the first contact part, wherein the second contact part one of immediately precedes and follows temporally the first contact part and wherein the second contact part represents a part of the contact different from the part represented by the first contact part.

6. A method for contact center management, the contact center comprising a plurality of resources operable to service a plurality of contacts, the plurality of resources corresponding to a plurality of contact center endpoints and the plurality of contacts corresponding to a plurality of customers and customer endpoints, comprising:
storing a first collection of data structures corresponding to a contact, the first collection of data structures comprising a contact identifier identifying a corresponding contact, wherein the contact identifier is associated with one of the plurality of customers; and
storing a second collection of data structures corresponding to a first contact part and a second contact part, the second collection of data structures comprising the contact identifier, a state identifier that identifies a state of a monitored endpoint, and a first contact part identifier and a second contact part identifier that identifies the first contact part and the second contact part respectively, wherein the first contact part represents a first part of the contact, the second contact part represents a second part of the contact, and the contact identifier uniquely identifies the contact of which the first contact part and the second contact part are a subpart, wherein the first contact part is for a text media contact from the monitored endpoint and the second contact part is for a voice media contact from the monitored endpoint and wherein the state identifier identifies a change in state or an overlap between the text media contact and the voice media contact.

7. The method of claim 6, wherein the first collection of data structures comprises a party identifier associated with a first resource.

8. The method of claim 6, wherein the first contact part is one of a plurality of contact parts representing the contact.

9. The method of claim 6, wherein the second collection of data structures comprises a media code identifying a type of media used during the first contact part, and a business role code identifying a role of a party associated with a monitored endpoint.

10. The method of claim 9, wherein the second collection further comprises a child contact part identifier identifying a second contact part related to the first contact part, wherein the second contact part one of immediately precedes and follows temporally the first contact part and wherein the second contact part represents a part of the contact different from the part represented by the first contact part.

11. The method of claim 6, wherein at least one of the second collection of data structures is created based on an additional party being conferenced into the contact or the additional party being conferenced out of the contact.

12. The memory of claim 1, wherein at least one of the second collection of data structures is created based on an additional party being conferenced into the contact or the additional party being conferenced out of the contact.

13. The memory of claim 1, wherein the first and second contact parts are maintained throughout the lifetime of the contact regardless of whether the first and second contact parts have been terminated during the contact.

14. The method of claim 1, wherein the state identifier identifies the change in state between the text media contact and the voice media contact.

15. The method of claim 1, wherein the state identifier identifies the overlap between the text media contact and the voice media contact.

16. The method of claim 1, wherein the monitored endpoint comprises a plurality of monitored endpoints.

* * * * *